(12) United States Patent
Anthony et al.

(10) Patent No.: US 10,213,029 B1
(45) Date of Patent: Feb. 26, 2019

(54) SLEEP FABRIC LAYER WITH INDIVIDUALLY POCKETED COILS

(71) Applicant: Hickory Springs Manufacturing Company, Hickory, NC (US)

(72) Inventors: Richard J. Anthony, Hickory, NC (US); Timothy M. Witherell, Hickory, NC (US); William B. Limer, Hickory, NC (US); Bradley G. Crump, Hickory, NC (US); John R. Mayo, Hickory, NC (US)

(73) Assignee: Hickory Springs Manufacturing Company, Hickory, NC (US)

( * ) Notice: Subject to any disclaimer, the term of this patent is extended or adjusted under 35 U.S.C. 154(b) by 0 days.

(21) Appl. No.: 15/498,102

(22) Filed: Apr. 26, 2017

Related U.S. Application Data (62) Division of application No. 14/943,378, filed on Nov. 17, 2015, now Pat. No. 9,635,952.

(Continued)

(51) Int. Cl.
*A47C 27/00* (2006.01)
*A47C 27/06* (2006.01)
(Continued)

(52) U.S. Cl.
CPC .......... *A47C 27/064* (2013.01); *A01M 31/00* (2013.01); *A41D 1/04* (2013.01); *A41D 31/005* (2013.01);
(Continued)

(58) Field of Classification Search
CPC ............ Y10T 428/233; Y10T 428/234; Y10T 428/239; A47C 27/14; A47C 27/15;
(Continued)

(56) References Cited

U.S. PATENT DOCUMENTS

| 1,852,943 A | 4/1932 | Swanson |
| 2,461,062 A | 2/1949 | Kane |

(Continued)

FOREIGN PATENT DOCUMENTS

| DE | 102008061465 B3 | 8/2009 |
| WO | WO-9635637 A1 | 11/1996 |

(Continued)

OTHER PUBLICATIONS

Search Report and Written Opinion issued by Inernational Searching Authority in related International Patent App. No. PCT/GB2013/052131 dated Nov. 5, 2013 (7 pages).

*Primary Examiner* — Alexander S Thomas
(74) *Attorney, Agent, or Firm* — Perkins Coie LLP (57) ABSTRACT

The present application provides a cushion having a core layer and a quilt support/comfort layer. The core layer may comprise innersprings, foams, air cells, or combinations thereof. The support/comfort layer comprises a sleep layer that simulates a conventional quilted fabric layer. The sleep layer includes a thick, comfort fabric and a backing fabric, which backing fabric may be the same as the thick, comfort fabric. The sleep layer is formed by coupling the thick, comfort fabric to the backing fabric to form a plurality of individual pockets in which micro spring coils are placed. The micro spring coils have less uncompressed height than conventional innerspring coils. The sleep layer coupling is formed by spot coupling without using a metal needle to stitch the layers together. In other words, the spot coupling may comprise an adhesive or weld.

13 Claims, 5 Drawing Sheets

Related U.S. Application Data (60) Provisional application No. 62/081,994, filed on Nov. 19, 2014.

(51) Int. Cl.

| | | |
|---|---|---|
| *A41D 31/00* | (2019.01) | |
| *A41D 1/04* | (2006.01) | |
| *A47C 7/18* | (2006.01) | |
| *A47C 7/34* | (2006.01) | |
| *A47C 7/35* | (2006.01) | |
| *A47G 9/08* | (2006.01) | |
| *A47G 9/10* | (2006.01) | |
| *A61G 7/05* | (2006.01) | |
| *A01M 31/00* | (2006.01) | |
| *B60N 2/70* | (2006.01) | |
| *A47C 1/16* | (2006.01) | |
| *A47C 1/14* | (2006.01) | |
| *A47C 27/08* | (2006.01) | |
| *A47C 31/00* | (2006.01) | |
| *A47C 27/05* | (2006.01) | |
| *A47C 27/12* | (2006.01) | |
| *A47C 27/22* | (2006.01) | |
| *E04H 15/56* | (2006.01) | |
| *F41H 5/04* | (2006.01) | |
| *F16F 3/04* | (2006.01) | |

(52) U.S. Cl.
CPC ............... *A47C 1/14* (2013.01); *A47C 1/16* (2013.01); *A47C 7/18* (2013.01); *A47C 7/34* (2013.01); *A47C 7/35* (2013.01); *A47C 27/05* (2013.01); *A47C 27/08* (2013.01); *A47C 27/121* (2013.01); *A47C 27/22* (2013.01); *A47C 31/001* (2013.01); *A47G 9/08* (2013.01); *A47G 9/10* (2013.01); *A61G 7/05* (2013.01); *B60N 2/7094* (2013.01); *E04H 15/56* (2013.01); *F16F 3/04* (2013.01); *F41H 5/04* (2013.01); *A47G 2009/1018* (2013.01); *F16F 2224/005* (2013.01); *Y10T 428/233* (2015.01); *Y10T 428/234* (2015.01)

(58) Field of Classification Search
CPC ....... A47C 27/064; A47C 27/04; A47C 27/05; A47C 27/053; A47C 27/002
See application file for complete search history.

(56) References Cited

U.S. PATENT DOCUMENTS

| | | |
|---|---|---|
| 3,462,779 A | 8/1969 | Thompson |
| 4,018,956 A | 4/1977 | Casey |
| 4,485,506 A | 12/1984 | Stumpf et al. |
| 4,549,323 A | 10/1985 | Brockhaus |
| 4,809,375 A | 3/1989 | Bull |
| 5,488,746 A | 2/1996 | Hudson |
| 5,966,759 A | 10/1999 | Sanders et al. |
| 6,397,418 B1 | 6/2002 | Stjerna |
| 6,398,199 B1 | 6/2002 | Barber |
| 6,631,529 B1 | 10/2003 | Erickson |
| 7,850,153 B2 | 12/2010 | Bock |
| 8,087,114 B2 | 1/2012 | Lundevall |
| 2005/0055778 A1 | 3/2005 | Kuchel |
| 2006/0236462 A1 | 10/2006 | Boyd |
| 2006/0272098 A1 | 12/2006 | Hochschild |
| 2007/0022540 A1 | 2/2007 | Hochschild |
| 2007/0199155 A1 | 8/2007 | Thygsen |
| 2007/0256246 A1 | 11/2007 | Gladney et al. |
| 2008/0189824 A1 | 8/2008 | Rock et al. |
| 2015/0230621 A1 | 8/2015 | Spinks et al. |

FOREIGN PATENT DOCUMENTS

| | | |
|---|---|---|
| WO | WO-9956951 A1 | 11/1999 |
| WO | WO-2007031774 A1 | 3/2007 |
| WO | WO-2011142549 A2 | 11/2011 |
| WO | WO-2011142549 A3 | 11/2011 |

SLEEP FABRIC LAYER WITH INDIVIDUALLY POCKETED COILS

CROSS-REFERENCE TO RELATED PATENT APPLICATIONS

This application is a division of U.S. patent application Ser. No. 14/943,378 filed on Nov. 17, 2015, which claims the benefit of and priority to U.S. Provisional Patent Application Ser. No. 62/081,994, filed Nov. 19, 2014, the entireties which are incorporated herein by reference as if set out in full.

BACKGROUND

Beds and other support surfaces for the body have been in existence for centuries. From straw and fabric to the highly technical mattresses of today, the industry has sought to improve upon the support for a person at rest in a supine position. People spend, on average, close to ⅓ of their life span asleep. Therefore, the need for comfortable support for the body during the sleep period is highly desirable.

The technology relating to improving mattresses is diverse and includes many designs that are oriented towards individual comfort. Some designs include spring based technology; some designs include air based technology; some designs include foam based technology, and some designs combine springs, air, and foam.

The technology relating to improving the mattresses generally relates to providing increased comfort and increased support. To increase comfort and support, some mattress technologies provide a somewhat uniform support over the majority of the mattress surface. The mattresses may be one of spring based, air based, foam based, or combinations thereof. All of the various technologies of conventional mattresses suffer from one or more drawbacks in the method and structure used to provide the desired comfort and support.

Spring based mattress technologies provide very good support for individual sleepers. However, due to spring constructions and limitations, the springs are often removed from the surface of the mattress/bed for comfort. Generally, a mattress that uses spring technology for support is enclosed by at least a flame retardant sock and outer ticking layer. Thus, the conventional mattress comprises a core or support layer and an upholstery or comfort layer. The outer ticking layer (or simply ticking layer) is the thick, outer fabric provided for comfort and, to some degree, aesthetics. Moreover, the core or support layer comprising the springs typically includes bounding technologies such as thick fabrics, foams, or textiles as a wrap to the spring supports.

However, despite improvements in the types and combination of springs (albeit singularly or in combination with foams and air), a need exists in the industry for improved comfort and support for mattresses using spring technology, in part, for support. Thus, against this background, an improved mattress is desirable.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a mattress having a core layer and a support/comfort layer is provided. The core layer may comprise innersprings, foams, air cells, or combinations thereof. The support/comfort layer comprises a sleep layer that simulates a conventional quilted fabric layer. The sleep layer includes a thick, comfort fabric and a backing fabric. The sleep layer is formed by coupling the thick, comfort fabric to the backing fabric to form a plurality of individual pockets in which spring coils are placed. The sleep layer coupling is formed by spot coupling without using a metal needle to stitch the layers together. In other words, the spot coupling may comprise an adhesive or weld.

The thick, comfort fabric may include, in one aspect, circular knit fabrics, warp knit fabrics, woven fabrics, nonwoven fabrics. The nonwoven fabrics may include spunbound fabrics, needlepunched fabrics, stitchbonded fabrics, and spun lace fabrics. The backing fabric generally comprises a fabric that may be coupled to the thick, comfort fabric. For example, if the coupling mechanism is a sonic weld, the backing fabric is generally chosen as one that can be sonically welded to the thick, comfort fabric.

The coils contained in the individual pockets formed in the quilted, ticking layer (which comprises the thick, comfort fabric and the backing layer) are micro-coils in one aspect of the technology. Generally, a micro-coil comprises a wire coil having an uncompressed height of less than 2.5 inches. In certain embodiments, the micro-coils may have an uncompressed height of approximately 0.50 inches. In still other embodiments, the micro-coils have an uncompressed height of between about 0.75 inches and 1.5 inches.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to mattresses having a core layer and a ticking, which is an industry term for the outer decorative fabric. However, the technology described herein may be used for other mattresses, bedding products, cushions, chairs, padding, and the like. For example, the technology of the present application may be applicable to foam mattresses, innerspring mattresses, air mattresses, toppers, pillows, bed rolls, sleeping bags, tent floors, yoga mats, exercise mats, tumbling and gymnastic mats, massage table mats, vehicle seats, stadium seats, outdoor seating pads, hunting pads, desk chairs, backpack layers, hospital bedding, interior layer of body armor, outdoor garments, and the like. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
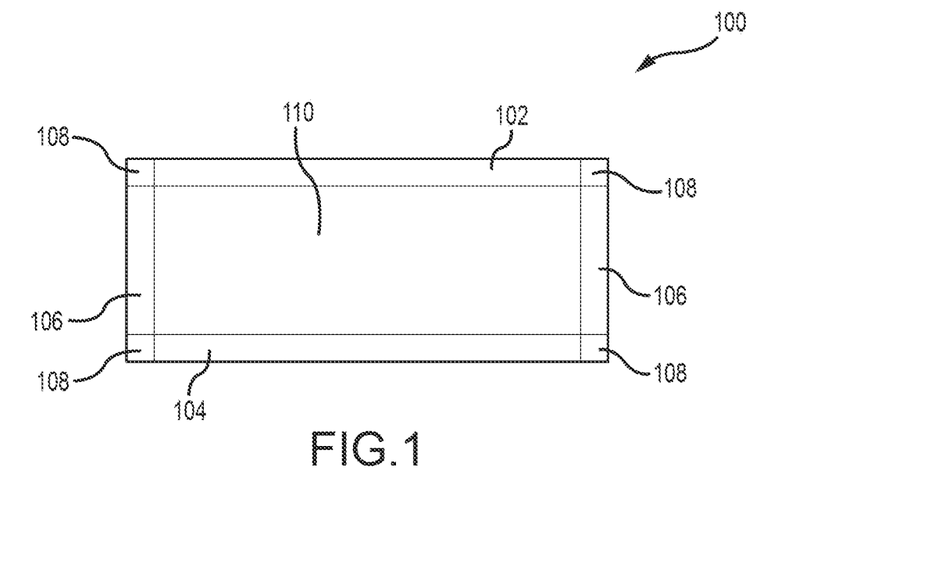
FIG. 1 is a cross-sectional view of a mattress consistent with the technology of the present application.

With reference now to FIG. 1, a mattress 100, consistent with the technology of the present application, is shown in cross-section. The mattress 100 may be for a conventional bed, an adjustable bed, a hospital bed, or the like. For reference, the mattress 100 has a sleep layer 102, which may be referred to as a top layer for reference. The sleep layer 102 comprises a sleep surface (which is the outer facing surface of the outer fabric as explained below) and a bottom surface (which is the outer facing surface of the backing fabric as explained below) opposite the sleep surface. The mattress 100 has a bottom layer 104 opposite the sleep layer 102. The sleep layer 102 and the bottom layer 104 are connected by a sidewall 106. Generally, the mattress 100 is rectangular in shape, but could be just about any shape. An edge or seam 108 generally couples the sidewall 106 to the sleep layer 102 and bottom layer 104. The edge or seam 108 may be formed by stitching or other means of coupling the parts, such as sonic welds, glues, heat welds, or the like. The sleep layer 102, bottom layer 104, and sidewall 106 generally form what is conventionally a ticking that encases the core of the mattress, and any other parts of the mattress.

The mattress 100 also comprises a core layer 110 that is encased by the ticking, which ticking comprises the sleep layer 102, the bottom layer 104, and the sidewalls 106. The core layer 110 may comprise a foam core, a fluid core (such as gas or liquid), a spring core (such as a conventional innerspring core), a combination thereof, or the like. The core layer 110, as described above, is a foam core in this exemplary embodiment. Generally, however, the core layer 110 includes several layers, which may be several layers of foams, layers of foam and springs, layers of fabrics and springs, or the like. Generally, a mattress with an innerspring as part of core layer 110 has macro spring coils, which are 3 inches in height in an uncompressed state in a compression direction or longer.

In one exemplary embodiment, the core layer 110 is described as having three (3) layers of foam. In one embodiment, a first layer of foam may comprise a viscoelastic polyurethane foam for comfort. Viscoelastic polyurethane foam, as is generally known in the art, may be either an open or closed cell foam. In certain aspects, the viscoelastic polyurethane foam may include an infusion of gel into the foam. Viscoelastic polyurethane foams generally conform to a shape based on pressure and heat. The second layer of foam may comprise a reticulated foam to help dissipate heat. As used herein, reticulated foam is an open cell foam structure that allows air flow volume through the foam of greater than approximately 5 standard cubic feet/minute; whereas, open cell foam, which is not a reticulated foam, has an air flow volume through the foam of less than 5 standard cubic feet/minute. The third foam layer is generally provided for support, and it typically comprises a conventional polyurethane foam, which may be of a closed or open cell configuration.

In another exemplary embodiment, the core layer 110 may include an innerspring central layer with outer foam layers between the innersprings and the sleep layer 102. Innerspring core layers 110 provide support comparable to foam core layers but are believed to be generally less comfortable overall. An innerspring core layer 110 generally comprises macrosprings, as mentioned above, which are generally 3 inches or more in uncompressed height. Thus, mattresses 100 has the innersprings significantly removed from the outermost layers of the mattress making them removed from the body of the individual (sleeper, user, etc.). The core layer 100, thus, provides support, but the mattress 100 has significantly more material between the individual and the innersprings of the core layer 110; such additional material may include one or more foam layers, down layers, etc. These intervening layers on conventional mattresses decrease the effectiveness of the innersprings and tend to "break-down" such that the support and comfort diminishes. In other words, one issue with conventional mattress technology is the "distance" of the springs from the sleeper. Moreover, placing microcoils closer to the surface alleviates pressure points and improves airflow. Coil density close to the surface helps to decrease the possibility of body impressions, therefore, possibly extending the life of the mattress. Innerspring coils, conventionally, are not placed in the comfort layer. Additionally, microcoils, which are generally in the 0.25 to 1.0 inch in height uncompressed, providing increased support at the sleep surface, retain their hardness (ILD) values for a longer duration than macrocoils in the innerspring cores, which helps the longevity of the mattress as the surface feel of the mattress remains more constant. The ability to retain their hardness also provides longevity for the height of the sleep layer, which puts less compressive stress on other filler material.

As mentioned above, the sleep layer 102 simulates a quilted fabric, which may be considered a part of the ticking, for the mattress 100. A quilted fabric typically has a pattern that forms pockets. A conventional quilted fabric has pockets filled with a batting or a wadding to provide pillowing and/or insulating. The sleep layer 102 simulates a quilt layer for aesthetics and comfort while a plurality of microcoils 206 are contained in the sleep layer to provide spring coil support on the topmost, outer layer of the mattress 100 placing the microcoils as close to the sleeper as possible such that intervening fabrics and foams cannot interfere with the comfort or support of the sleep layer 102. The sleep layer 102 having microcoils, generally, retains the overall thickness appearance of a conventional quilt, which would generally not be possible with conventional spring coils used in mattresses. Additionally, the microcoils facilitate air flow by acting as pumps of bellows and facilitate distribution of body weight across the mattress.

Figure 2:
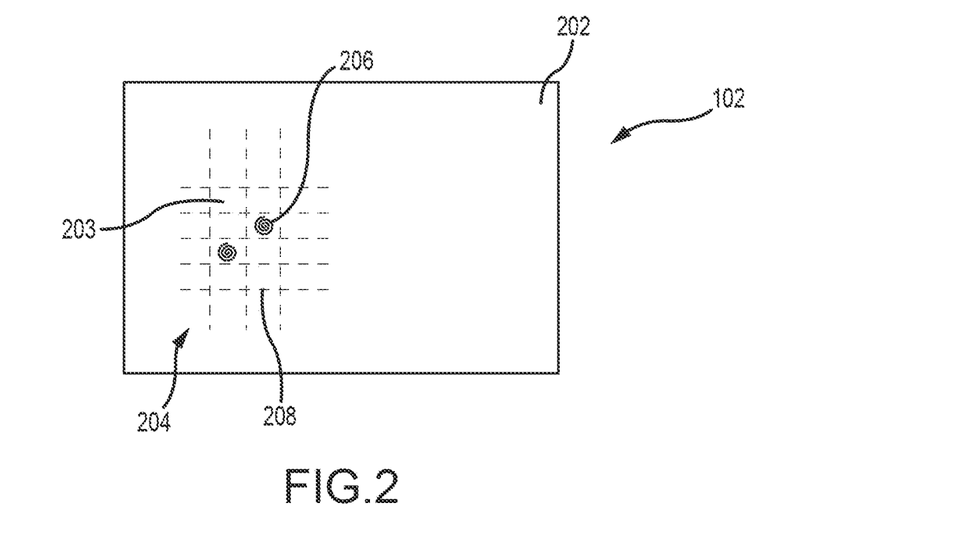
FIG. 2 is a partial top view of the sleep layer of the mattress of FIG. 1 consistent with the technology of the present application.

With reference now to FIG. 2, a top plan view of the sleep layer 102 is shown. The sleep layer 102, which may be referred to as a comfort/support layer, generally comprises fabric simulating a conventional quilted fabric in that it has a decorative and comfortable visible outer fabric 202 and a pattern 204 formed on the outer fabric, although only a portion of one sample pattern 204 is shown in FIG. 2. The pattern 204 forms pockets 203 similar to the pockets of a conventional quilted fabric mentioned above. However, rather than batting or wadding, the sleep layer 102 provides an individual microcoil 206 in each of the pockets to provide the plurality of microcoils 206 for comfort and support. An individual microcoil 206 means that any one microcoil, typically formed by a metal wire coil spring, is not connected to any other microcoil. The individual microcoils 206 are preferably no more than 1.00 inch in height when not compressed. In other embodiments, the microcoils 206 are preferably no less than 0.50 inches in height. As will be appreciated by one of ordinary skill in the art on reading the present application, the microcoils 206 only have one (1) fabric, the outer fabric 202, between the microcoils 206 and the sleeper, unlike conventional spring mattresses or cushions that typically have foam, fabric, and other materials between the coils and the sleeper for comfort and aesthetics.

A quilted fabric, as is generally known in the industry, is a type of fabric comprising two fabrics (an outer fabric and a backing fabric) that are stitched together with a decorative stitch pattern, such as pattern 204 shown in FIG. 2. Generally, for a conventional quilt fabric, a batting or a wadding is contained between the two fabric layers to provide pillowing and/or insulating. The batting or wadding may be cotton, air, or the like. The technology of the present application provides the sleep layer as a quilted fabric where stitch pattern 204 forms a plurality of pockets 203 (individual pockets) into which individual microcoils or microsprings 204 are placed. The microcoils 206 allow the sleep layer 102 to function both for comfort and support. As used herein, microsprings are generally spring coils having an uncompressed height of no more than 2.5 inches and a diameter of no greater than 4 inches. As can be appreciated, the microcoils 206 comprise, in most instances, a metal wire spring. In one exemplary embodiment, the microcoils 206 are no more than 1.00 inch in uncompressed height. In another exemplary embodiment, the microcoils 206 are no less than 0.50 inches in uncompressed height. In other words, in certain embodiments, the microcoils should be between 0.50 inches and 1.00 inches in uncompressed height.

Conventional quilting machines use metallic needles to form the decorative stitch pattern. Conventional metallic needles of the quilting machines, however, do not function well with metal wire springs as the batting/wadding between the two fabrics. Thus, the technology of the present application forms the pattern 204 in sleep layer 102 using a spot coupling 208 of the outer fabric and backing fabric generally simulative of a conventional quilting stitch pattern. The bottom layer 104 and sidewalls 106 may similarly have a pattern 204 formed using the same spot coupling 208. Alternatively, the bottom layer 104 and sidewalls 106 may be a conventional quilted fabric as the bottom layer 104 and sidewalls 106 generally do not contain the microcoils. The spot coupling 208 may be, for example, a sonic weld or a heat weld of the two fabric layers. In some embodiments, the spot coupling 208 may be adhesives or the like. See international publication WO2014/023975, titled Resilient Unit with Different Major Surfaces, published Feb. 13, 2014, and incorporated herein by reference as if set out in full.

Figure 3:
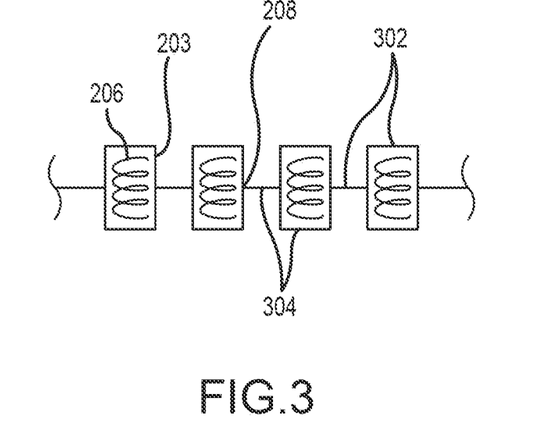
FIG. 3 is a cross-sectional view of the outer fabric of the sleep layer of FIG. 2 consistent with the technology of the present application.

FIG. 3 shows a portion of sleep layer 102 in cross-section. The sleep layer 102 has an outer fabric 302 and a backing fabric 304 coupled via the spot coupling 208 to form pockets 203. The pockets 203 contain microcoils 204. While shown as rectangular pockets 203, the shape would be somewhat determined by the desired quilting pattern, which may make the cross-sectional shape more of a diamond or trapezoidal shape. The outer fabric 302 of the sleep layer 102 comprises a relatively thick, comfort fabric. Generally the thick, comfort fabric may have a weight of generally ranging between 5 grams per square meter and 1000 grams per square meter. The thick, comfort fabric may include, in one aspect, woven fabrics comprising circular knit fabrics, warp knit fabrics, and the like. The tick, comfort fabric also may include nonwoven fabrics such as spunbound fabrics, needlepunched fabrics, stitchbonded fabrics, and spun lace fabrics. Often, the outer fabric is a cotton or linen textile, tightly woven for durability, aesthetics, feel, and comfort. The backing fabric 304 generally comprises a fabric that may be coupled to the thick, comfort fabric. In certain embodiments, the backing fabric 304 may be identical to the outer fabric 302. For example, if the spot coupling 208 is a sonic weld, the backing fabric is generally chosen as one that can be sonically welded to the thick, comfort fabric of choice.

The backing fabric 304 comprises a fabric that reduces the noise or interaction between the outer fabric 302 and the backing fabric 304 that can produce discomfort to the sleeper, such as, for example, scratching or noise. The backing fabric 304 also generally comprises a fabric that may be coupled to the outer fabric 302. For example, if the coupling mechanism is a sonic weld, the backing fabric is generally chosen as one that can be sonically welded to the thick, comfort fabric of choice. When not identical to the outer fabric 302, the backing fabric 304 may be a lightweight fabric and may be a knit type fabric, a woven, or nonwoven scrim.

In constructing the sleep layer 102, which simulates a conventional quilt or ticking layer, the microcoils 206 are arranged between the outer fabric 302 and the backing fabric 304 of the sleep layer 102. Generally, the microcoils 206 are slightly compressed in the arrangement. The spot coupling 208 is next applied to form the pattern 204. The compressed microcoils 206 attempt to expand, which stretches the pocket to provide a smoother finish to the sleep layer 102.

A conventional mattress, as explained above, has a core layer and a ticking. The conventional mattress also comprises a sock that envelops the core layer and resides between the core layer and the ticking. Conventionally, the sock is required to provide flame retardant consistent with many government regulations. The outer fabric or the backing fabric of the present application, however, may be formed with flame retardant directly loaded into the fabrics. Thus, the sock between the sleep layer 102 and the core layer 110, of the present application, is removed providing still less material to potentially breakdown between the sleeper and the core layer 110.

As can be appreciated, the sleep layer 102 comprising the outer fabric spot coupled to the backing fabric forming a plurality of pockets with microcoils 204 can be used in other bedding applications including, for example, on a topper or the surface of a pillow.

Figure 4:
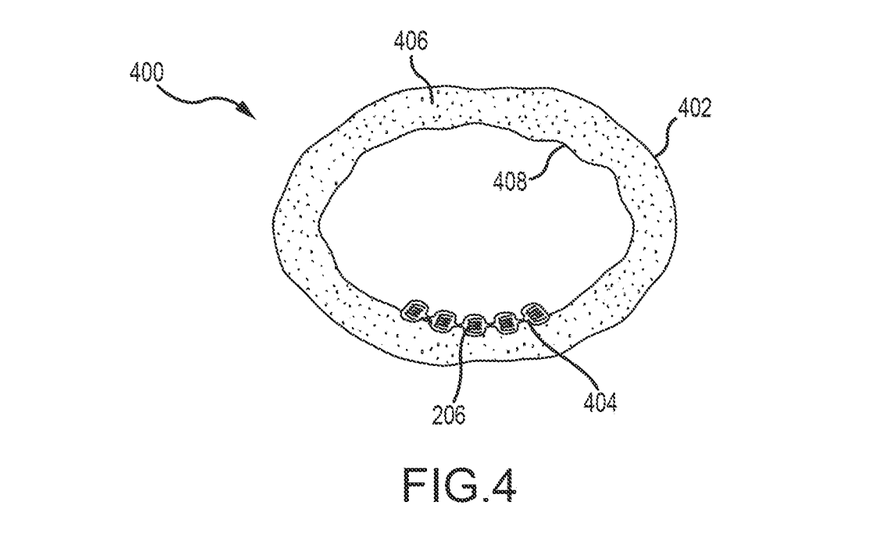
FIG. 4 is a cross-sectional view of a sleeping bag incorporating the sleep layer of FIGS. 2 and 3 consistent with the technology of the present application.
Figure 5:
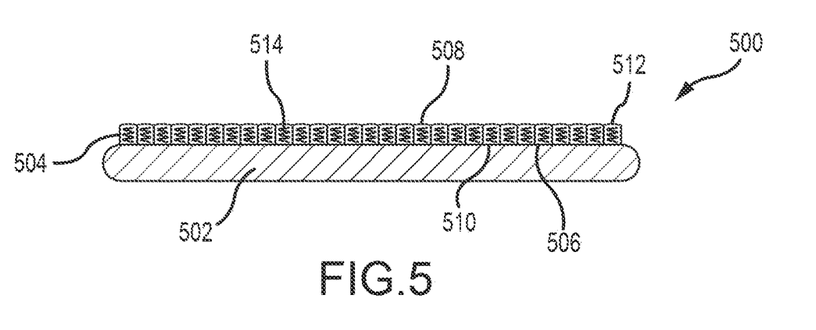
FIG. 5 is a cross-sectional view of a bed roll or mat incorporating the comfort layer of FIGS. 2 and 3 consistent with the technology of the present application.

Another novel application of the sleep layer 102, of the present application, includes using the sleep layer 102 in the construction of a sleeping bag or a bed roll. With reference to FIG. 4, for example, a sleeping bag 400 is shown in cross section. The sleeping bag 400 comprises an outer layer 402, which is typically a waterproof material, an inner sleep layer 404, similar to the sleep layer 102 described above, and a fill material 406 contained between the inner sleep layer 404 and the outer layer 402. The inner sleep layer 404 may be contained on one side of the sleeping bag 400, as shown, or traverse the entire (or a majority of) an inside surface 408 of the sleeping bag 400. To accommodate a zipper or other closure mechanism, the inner sleep layer 404 may be discontinuous. The inner sleep layer 404, which is the innermost and surface layer, provides a comfortable fabric inner layer, similar to the fabrics of the outer fabric 302 described above, with the support more akin to an innerspring mattress via the relatively lightweight microcoils 206. The inner sleep layer 404, similar to the sleep layer 102, is the layer closest to the sleeper on the product. The outer fabric 302 of the inner sleep layer 404 would generally be a fabric that can withstand elements for use as a sleeping bag 300. Similarly, if the sleep layer 102 is provided as an outermost layer for a bedroll 500 (FIG. 5), the outer fabric 302 and backing fabric 304 may be chosen as fabrics that can withstand the elements or be treated to withstand the elements, such as waterproofing or the like. The bedroll 500 includes a base layer 502 of a conventional bedroll, which may be foam or other filler. A sleep layer 504 is attached to the top surface 506 of the bedroll 500. The sleep layer 504 has the outer fabric 508 spot coupled to the backing fabric 510 forming pockets 512 that contain microcoils 514. Alternatively, the bedroll 500 could be a hunting pad, a tumbling mat, a yoga mat, a massage table surface, an exercise mat, or an air mattress.

Figure 6:
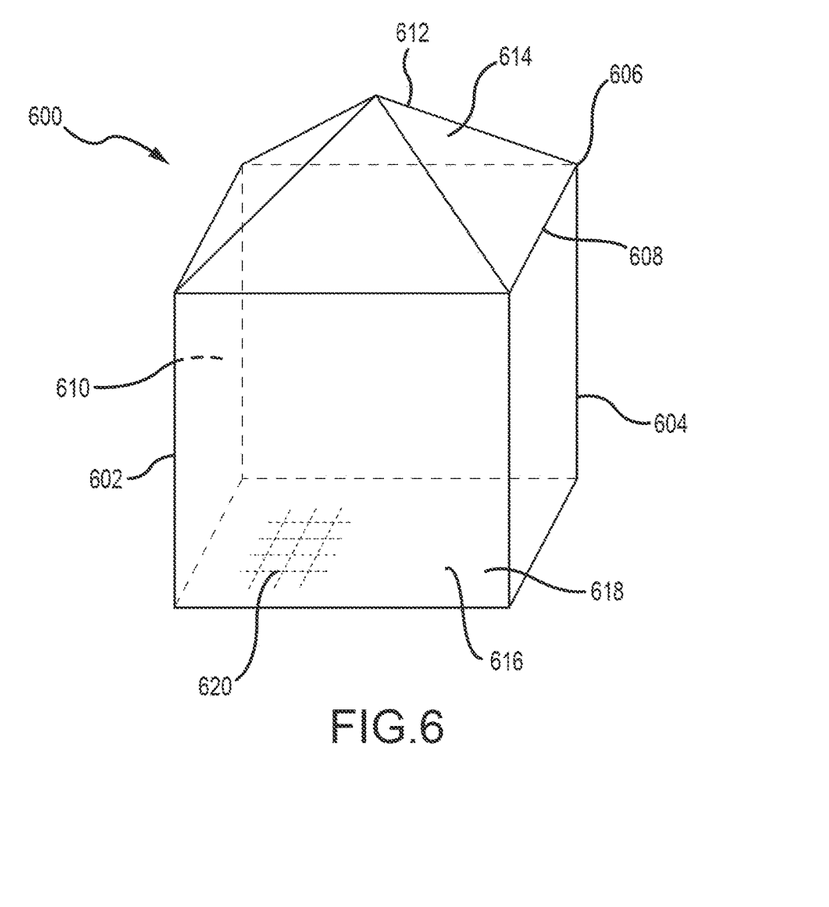
FIG. 6 is a view of an outdoor structure having a floor incorporating the comfort layer of FIGS. 2 and 3 consistent with the technology of the present application.

With reference to FIG. 6, a novel tent 600 is provided. The tent 600 has a frame 602 generally comprising vertical (or canted) poles 604 coupled on an upper end 606 by horizontal beams 608. The tent 600 comprises fabric walls 610 extending between the poles 604 and supported by the beams 608. Roof support members 612 extends from the upper end 606 of the poles to a peak 614. A fabric roof 614 is supported by the roof support members 612 and supported by the beams 608. The floor 616 of the tent 600 comprises a top layer 618 constructed in a manner similar to the sleep layer 102 described hereinabove. The floor 616 is provided with a pattern 620 via the aforementioned spot coupling of the outer fabric to the backing fabric to form a plurality of pockets to contain the individual microcoils.

Figure 7:
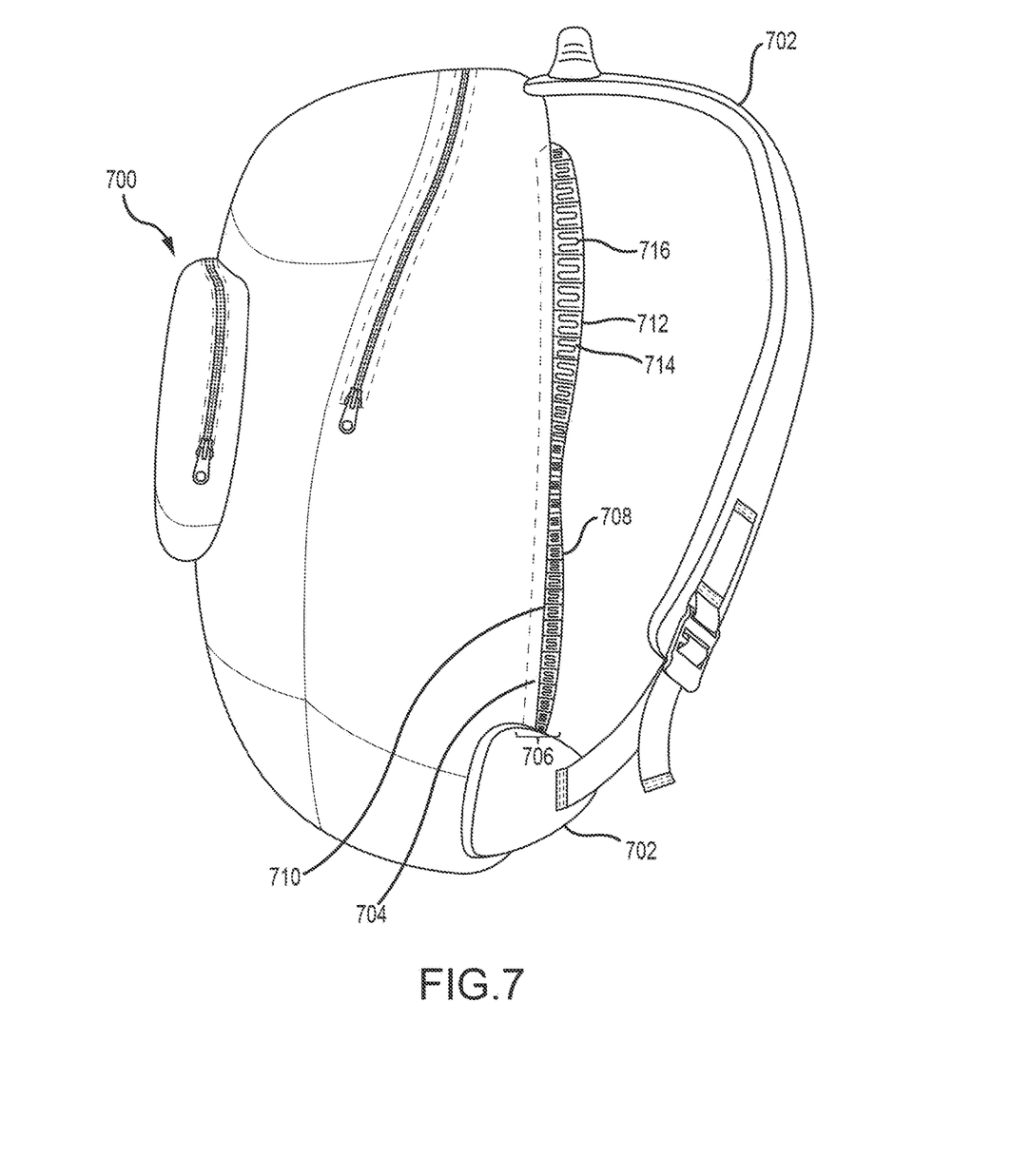
FIG. 7 is a side view of a backpack having a surface incorporating the comfort layer of FIGS. 2 and 3 consistent with the technology of the present application.

FIG. 7 shows a backpack 700. The backpack 700 includes a plurality of straps 702 about the shoulders of a wearer and, in some cases, about the waist of a wearer. The backpack 700 has a panel 704 that generally abuts the back of the person wearing the backpack 700. Consistent with the technology of the present application, the panel 704 may have a comfort layer 706 coupled to the panel 704 to be between the panel 704 and the back of the wearer. The comfort layer 706 would comprise an outer fabric 708 and a backing fabric 710 coupled by spot coupling 712 to form a pattern and a plurality of individual pockets 714 that contain microcoils 716. The microcoils 716 may deviate in size and resistance over the comfort layer 706 in response to the expected pressure points.

Figure 8:
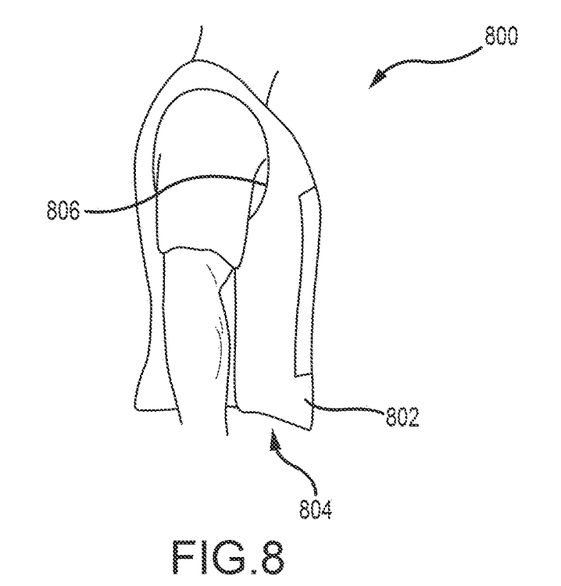
FIG. 8 is a side view of a bulletproof vest incorporating the comfort layer of FIGS. 2 and 3 consistent with the technology of the present application.

In yet another innovation, FIG. 8 shows a vest constructed consistent with body armor, such as a bulletproof vest 800. The vest 800 may include fibers along with plates generally made from metal or ceramics that disburse the projectiles energy without allowing penetration of the projectile through the body armor. The vest 800 includes an outer layer 802, an intermediate layer 804, and an inner comfort layer 806. The outer layer 802 and intermediate layer 804 combine to provide the resistance while the comfort layer 806 provides comfort, support, and additional spring/cushioning to resist impact and trauma. The comfort layer 806, similar to the comfort layer 706 described above, includes an outer fabric and a backing fabric coupled by spot coupling to form a pattern and a plurality of individual pockets that contain microcoils.

Figure 9:
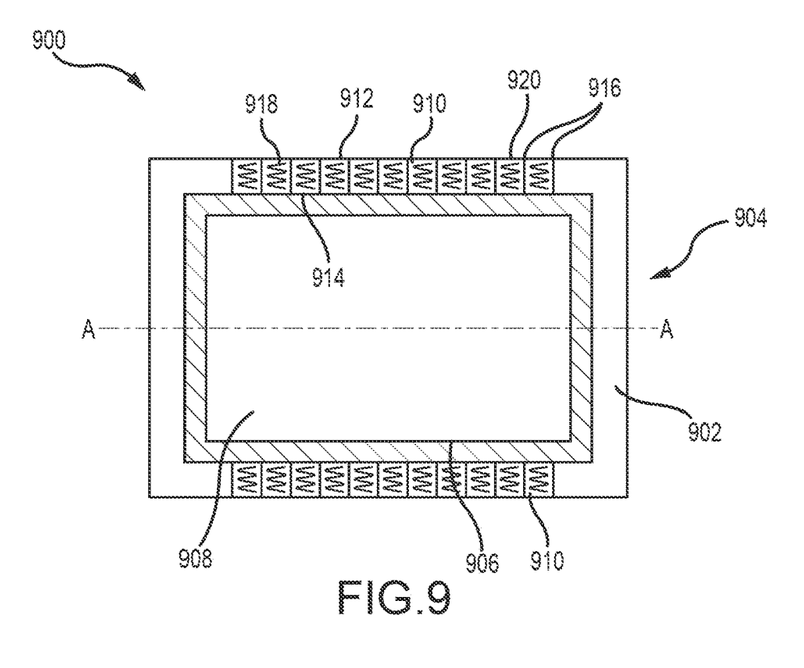
FIG. 9 is a cross-sectional view of a cushion for a seat, such as a vehicle or stadium seat, incorporating the comfort layer of FIGS. 2 and 3 consistent with the technology of the present application.

FIG. 9 shows a seat cushion 900 consistent with the technology of the present application. The seat cushion 900 may be useable with vehicle seats, stadium seats, desk chairs, or the like. Cushion 900 is reversible or substantially symmetric about a central axis A, but does not need to be symmetric. Cushion 900 includes an outer layer 902 and a stuffing 904. The stuffing 904 generally comprises a wrap 906 and a core 908, similar to the core layer 110 of a mattress as discussed above. At least a portion of the outer layer 902 comprises a comfort layer 910. As shown, a comfort layer 910 is shown on opposite sides of the symmetric cushion 900. The comfort layer 910 comprises an outer fabric 912 coupled to a backing fabric 914 by a plurality of spot couplings 916 in a pattern forming a plurality of pockets 918. An individual microcoil 920 is placed in the pockets 918.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

The invention claimed is:

1. An apparatus to provide cushioning for a surface, comprising:
   a core layer, wherein the core layer comprises at least one layer of foam; and
   an outer support layer, the outer support layer substantially encasing the core layer, wherein the outer support layer comprises:
      a first comfort fabric having an outer surface and an interior surface opposite the outer surface,
      a second backing fabric having an interior surface facing the interior surface of the first comfort fabric and a core surface facing and abutting the core layer,
      a plurality of couplings between the first comfort fabric and the backing fabric such that the interior surfaces abut at the couplings forming a plurality of pockets defined by the first comfort fabric, the second backing fabric, and the plurality of couplings; and
      a plurality of microcoils wherein each microcoil is contained within a pocket.

2. The apparatus of claim 1 wherein the backing fabric is the same as the first comfort fabric.

3. The apparatus of claim 1 wherein the plurality of microcoils have an uncompressed height of no more than 1 inch.

4. The apparatus of claim 3 wherein the plurality of microcoils have an uncompressed height of no less than 0.5 inches.

5. The apparatus of claim 1 wherein the plurality of microcoils have an uncompressed height of no less than 0.25 inches.

6. The apparatus of claim 1 wherein the height of the plurality of pockets is less than the uncompressed height of the plurality of microcoils.

7. The apparatus of claim 1 wherein the core layer further comprises at least one innerspring layer.

8. The apparatus of claim 7 wherein the innerspring layer comprises macrocoils.

9. The apparatus of claim 1 wherein each pocket of the plurality of pockets contains at least one of the plurality of microcoils.

10. The apparatus of claim 1 wherein at least some of the plurality of pockets contain filler.

11. The apparatus of claim 1 wherein the apparatus comprises at least one apparatus selected from the group of apparatuses consisting of: a sleeping bag, a bed roll, a topper, a pillow, a tent floor, a yoga mat, an exercise mat, a tumbling mat, a gymnastic mat, a massage table mat, a hunting pad, or a hospital bed.

12. The apparatus of claim 1 wherein the apparatus comprises at least one apparatus selected from the group of apparatuses consisting of: a chair, a vehicle seat, a stadium seat, an outdoor seat, or a desk chair.

13. The apparatus of claim 1 wherein the apparatus comprises at least one apparatus selected from the group of apparatuses consisting of: an interior layer of body armor or an outdoor garment.

* * * * *